United States Patent
Nguyen

(10) Patent No.: US 9,520,662 B2
(45) Date of Patent: Dec. 13, 2016

(54) LATCHING MECHANISMS FOR PLUGGABLE ELECTRONIC DEVICES

(71) Applicant: FINISAR CORPORATION, Sunnyvale, CA (US)

(72) Inventor: Long Van Nguyen, San Jose, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 157 days.

(21) Appl. No.: 14/270,208

(22) Filed: May 5, 2014

(65) Prior Publication Data

US 2014/0242826 A1     Aug. 28, 2014

Related U.S. Application Data

(63) Continuation of application No. 13/096,497, filed on Apr. 28, 2011, now Pat. No. 8,717,770.

(51) Int. Cl.
| | |
|---|---|
| G02B 6/42 | (2006.01) |
| H01R 12/71 | (2011.01) |

(52) U.S. Cl.
CPC ........... *H01R 12/716* (2013.01); *G02B 6/4261* (2013.01); *G02B 6/4284* (2013.01); *G02B 6/4292* (2013.01)

(58) Field of Classification Search
None
See application file for complete search history.

(56) References Cited

U.S. PATENT DOCUMENTS

| | | | | |
|---|---|---|---|---|
| 5,028,115 A | * | 7/1991 | Grosse-Boes | G02B 6/3847 385/77 |
| 5,140,663 A | * | 8/1992 | Edwards | G02B 6/3869 385/139 |
| 6,430,053 B1 | * | 8/2002 | Peterson | H01R 13/6335 361/728 |
| 6,824,416 B2 | * | 11/2004 | Di Mascio | G02B 6/4292 439/160 |
| 6,851,867 B2 | * | 2/2005 | Pang | G02B 6/3825 385/134 |
| 6,872,010 B1 | | 3/2005 | Bianchini | |
| 7,004,772 B1 | * | 2/2006 | Hsiao | G02B 6/4292 361/728 |
| 7,052,306 B2 | * | 5/2006 | Ishigami | G02B 6/4201 439/372 |
| 7,083,336 B2 | | 8/2006 | Kim et al. | |

(Continued)

FOREIGN PATENT DOCUMENTS

| | | |
|---|---|---|
| CN | 1788394 A | 6/2006 |
| CN | 1855643 A | 11/2006 |

(Continued)

*Primary Examiner* — Xanthia C Cunningham
(74) *Attorney, Agent, or Firm* — Maschoff Brennan

(57) ABSTRACT

Latching mechanisms for pluggable electronic devices when received within a host cage of a host device. In one example embodiment, the host cage is configured to be connected to a host printed circuit board and configured to at least partially surround a host connector. The host cage includes a pair of inwardly biased leaf springs that extend toward the host connector and thereby engage with the latching mechanism of the pluggable electronic module in order to secure the pluggable electronic module within the host cage.

15 Claims, 18 Drawing Sheets

(56) References Cited

U.S. PATENT DOCUMENTS

| | | | |
|---|---|---|---|
| 7,090,523 B2* | 8/2006 | Shirk | G02B 6/4246 439/352 |
| 7,186,134 B2* | 3/2007 | Togami | H01R 13/6275 439/160 |
| 7,306,381 B2* | 12/2007 | Yu | G02B 6/4292 385/92 |
| 7,422,457 B1* | 9/2008 | Wu | G02B 6/4201 439/258 |
| 7,507,103 B1* | 3/2009 | Phillips | G02B 6/4201 439/352 |
| 7,513,693 B2 | 4/2009 | Wang | |
| 7,559,800 B2* | 7/2009 | Wu | H01R 13/65802 439/607.3 |
| 7,699,641 B2* | 4/2010 | Bright | H01R 13/6275 439/352 |
| 7,841,779 B1 | 11/2010 | Bianchini et al. | |
| 8,040,687 B2* | 10/2011 | Pirillis | H05K 7/1412 361/801 |
| 2003/0171016 A1* | 9/2003 | Bright | G02B 6/4201 439/160 |
| 2004/0033027 A1 | 2/2004 | Pang et al. | |
| 2004/0219819 A1* | 11/2004 | Di Mascio | G02B 6/4292 439/352 |
| 2006/0030187 A1* | 2/2006 | Hsiao | G02B 6/4292 439/160 |
| 2008/0310136 A1* | 12/2008 | Huang | G02B 6/4292 361/801 |
| 2009/0279831 A1* | 11/2009 | Luo | H01R 13/6335 385/53 |

FOREIGN PATENT DOCUMENTS

| | | |
|---|---|---|
| CN | 1947046 A | 4/2007 |
| JP | 2005-520296 | 7/2005 |
| WO | 03/077626 A1 | 9/2003 |
| WO | 2004/093258 A1 | 10/2004 |

* cited by examiner

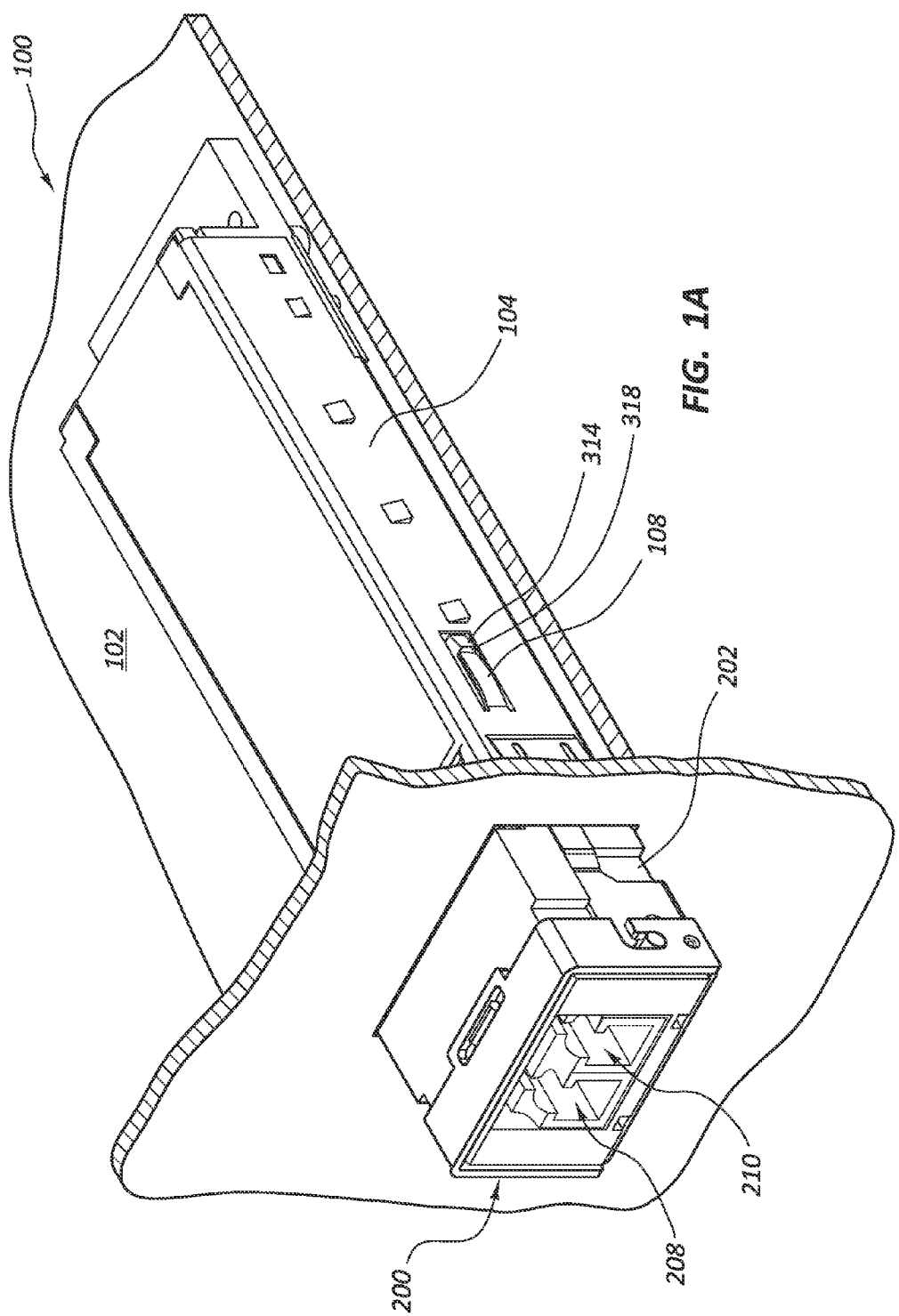

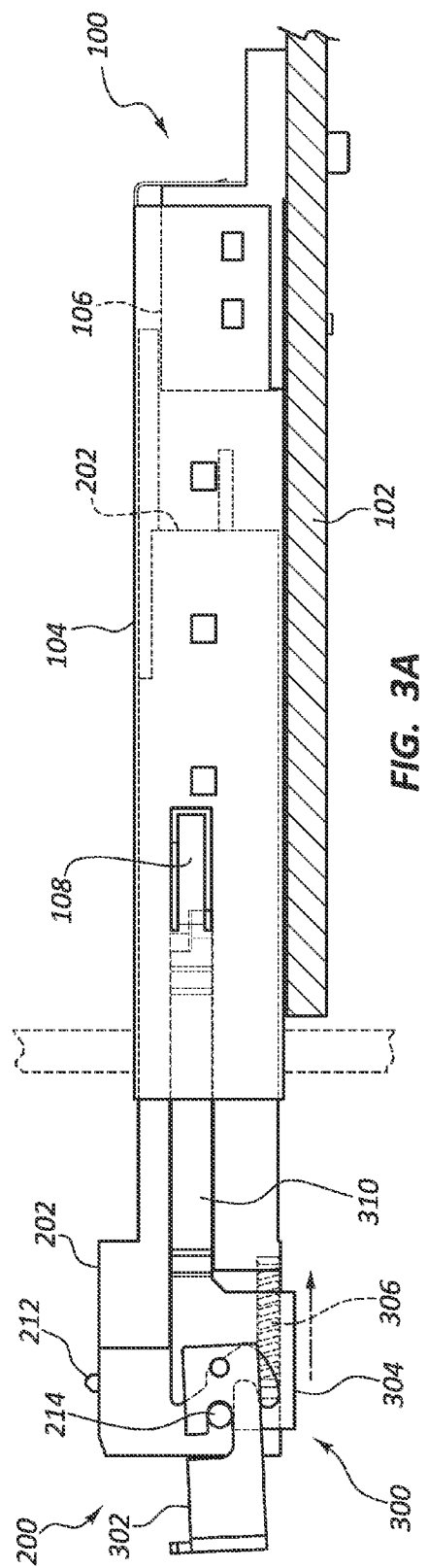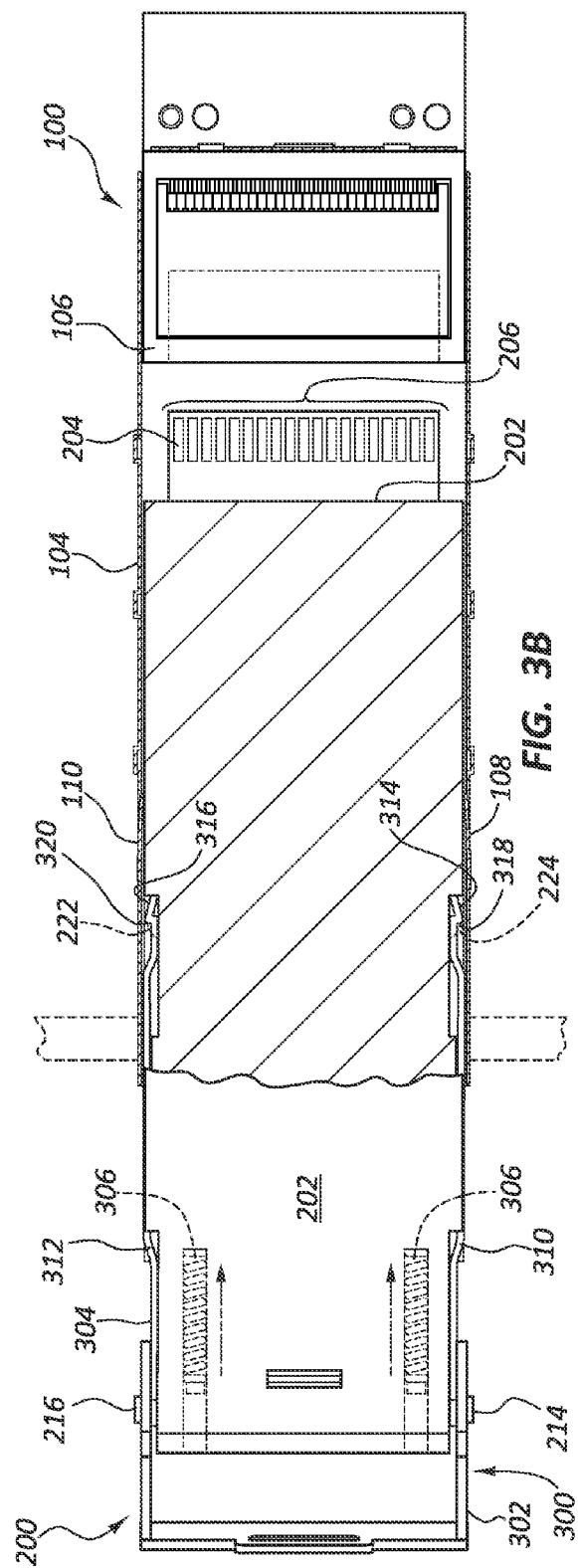

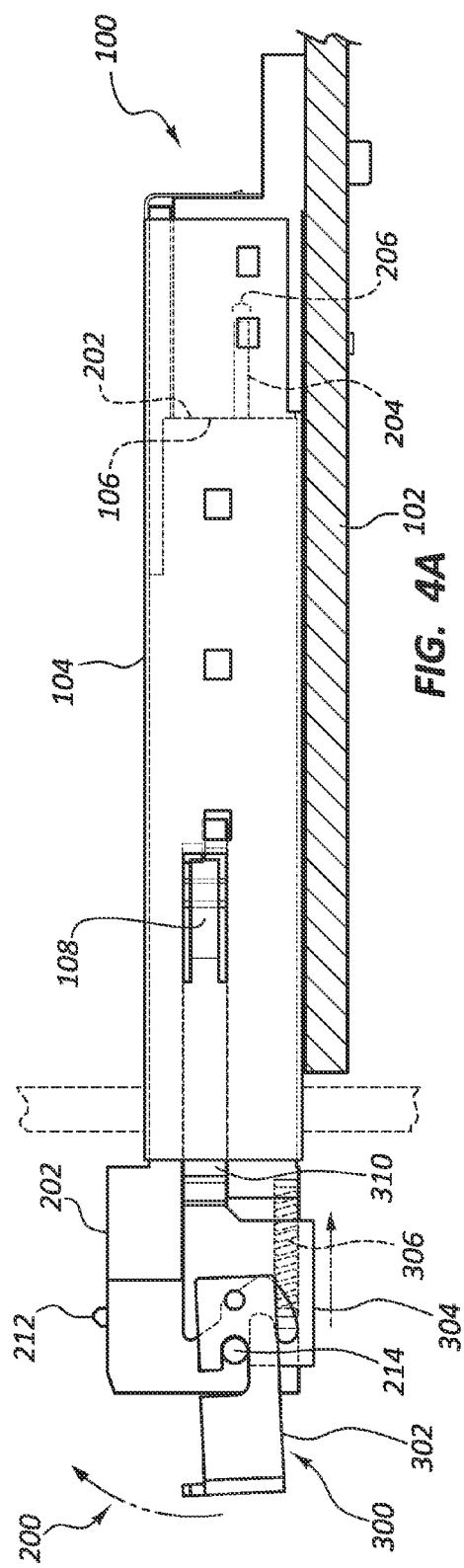
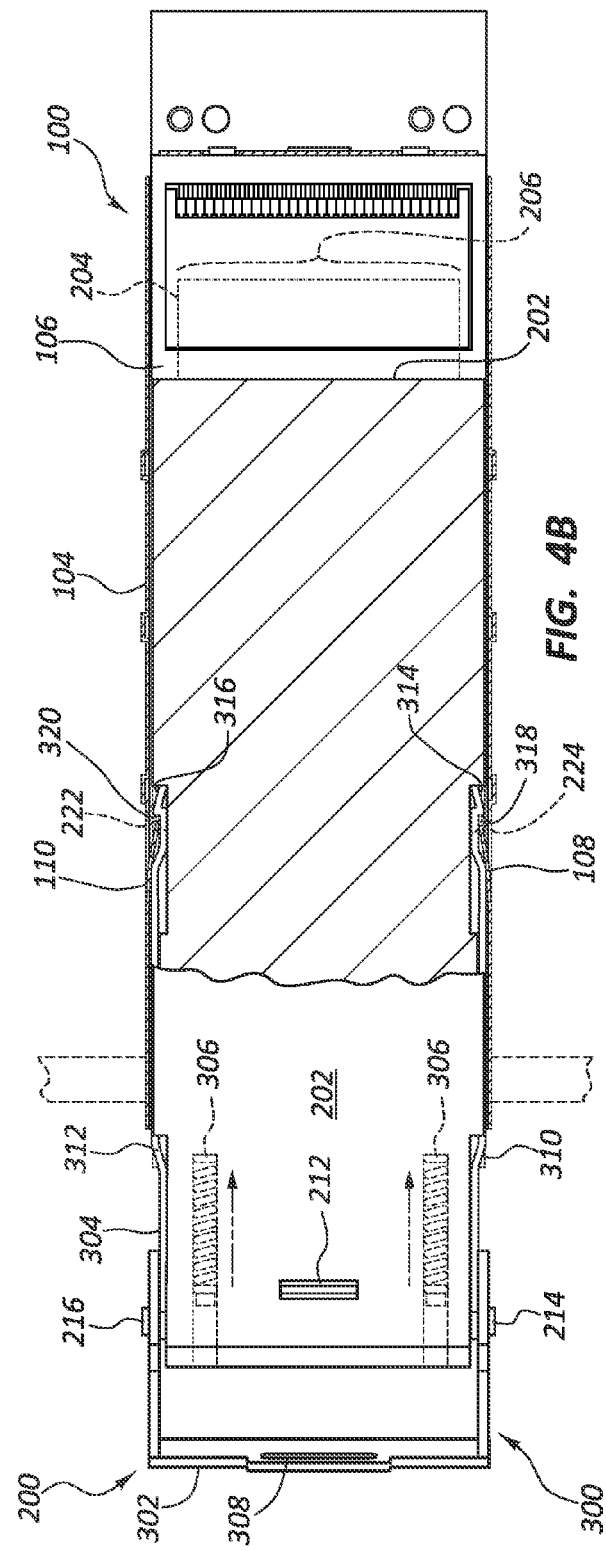
FIG. 4A
FIG. 4B

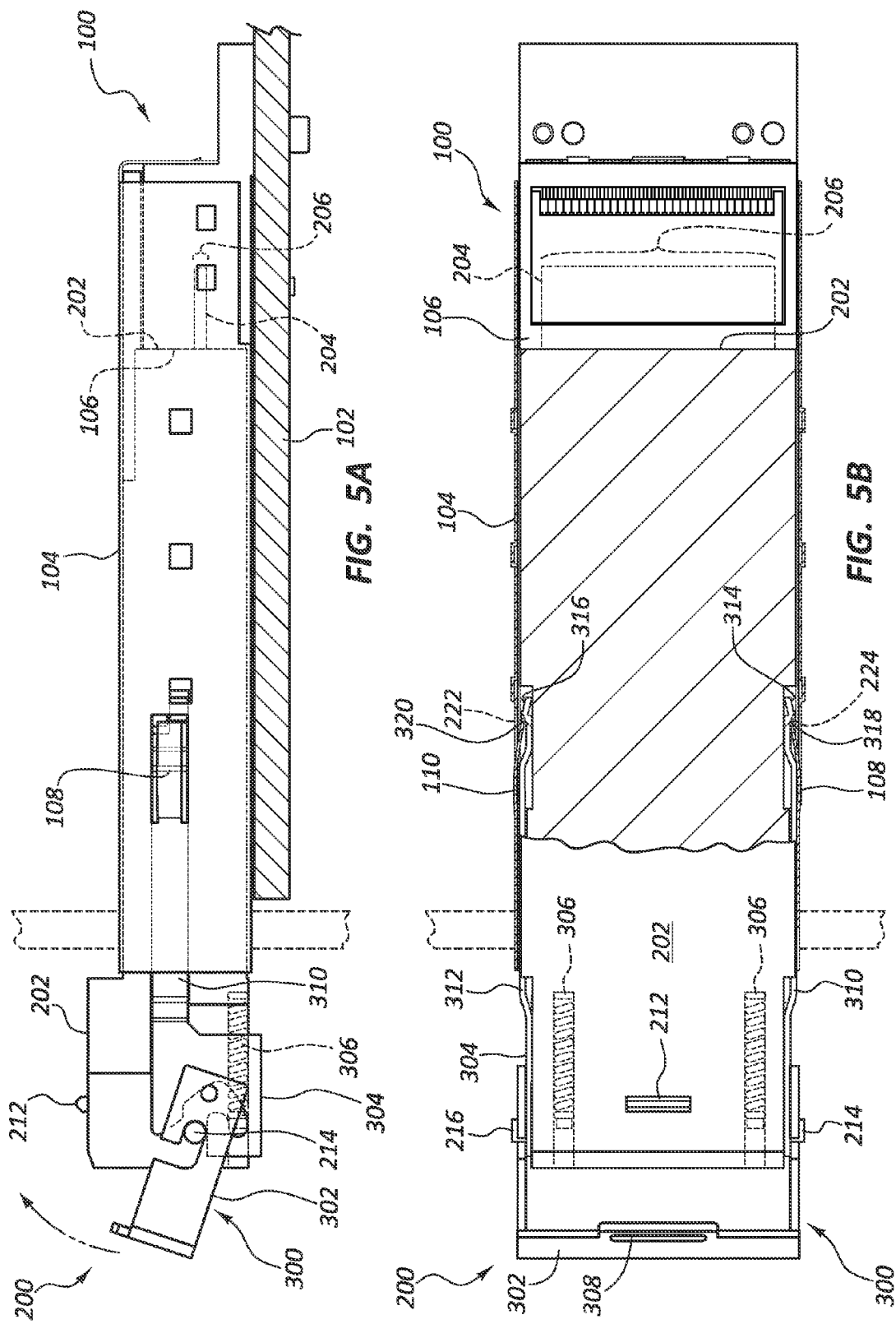

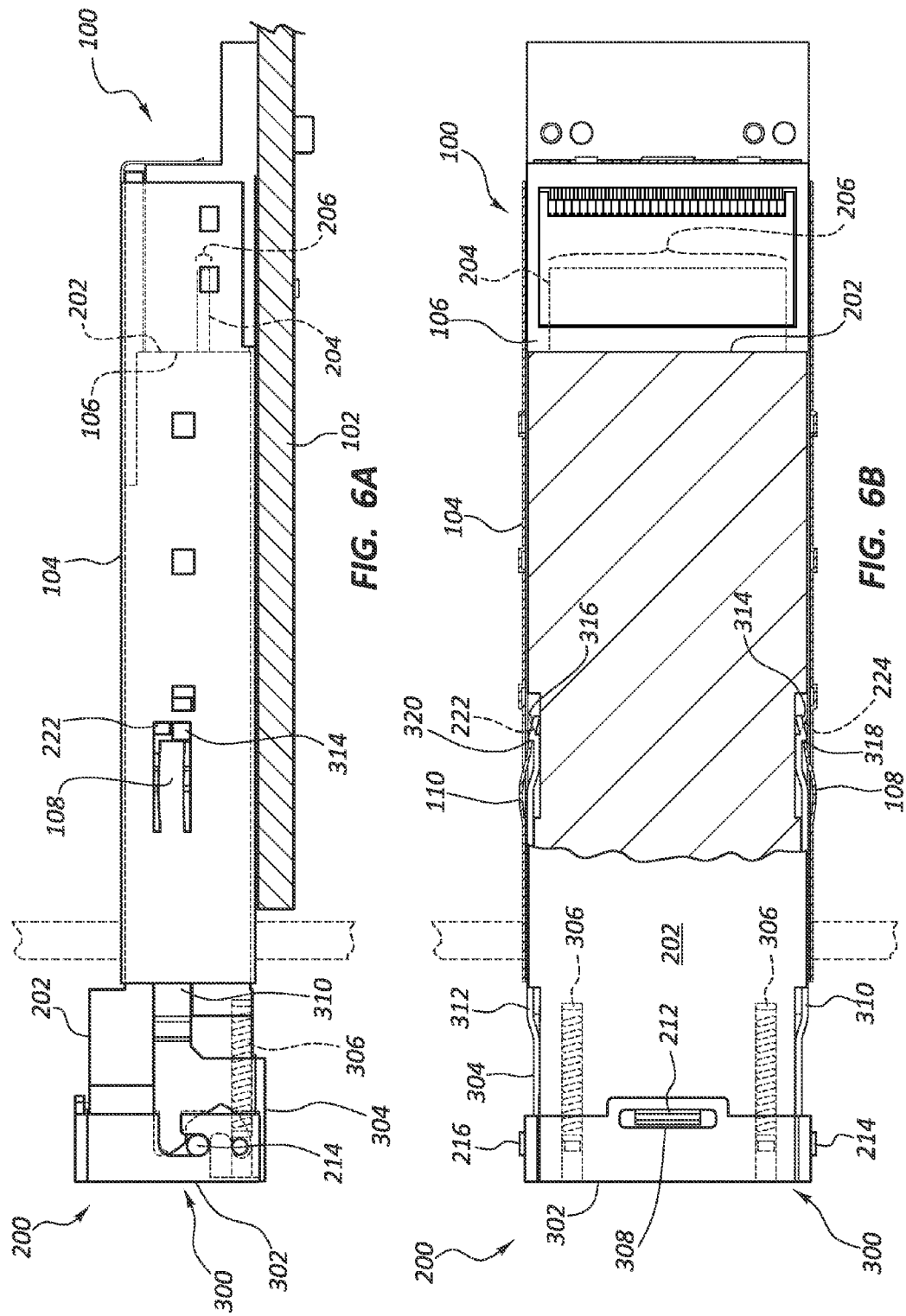

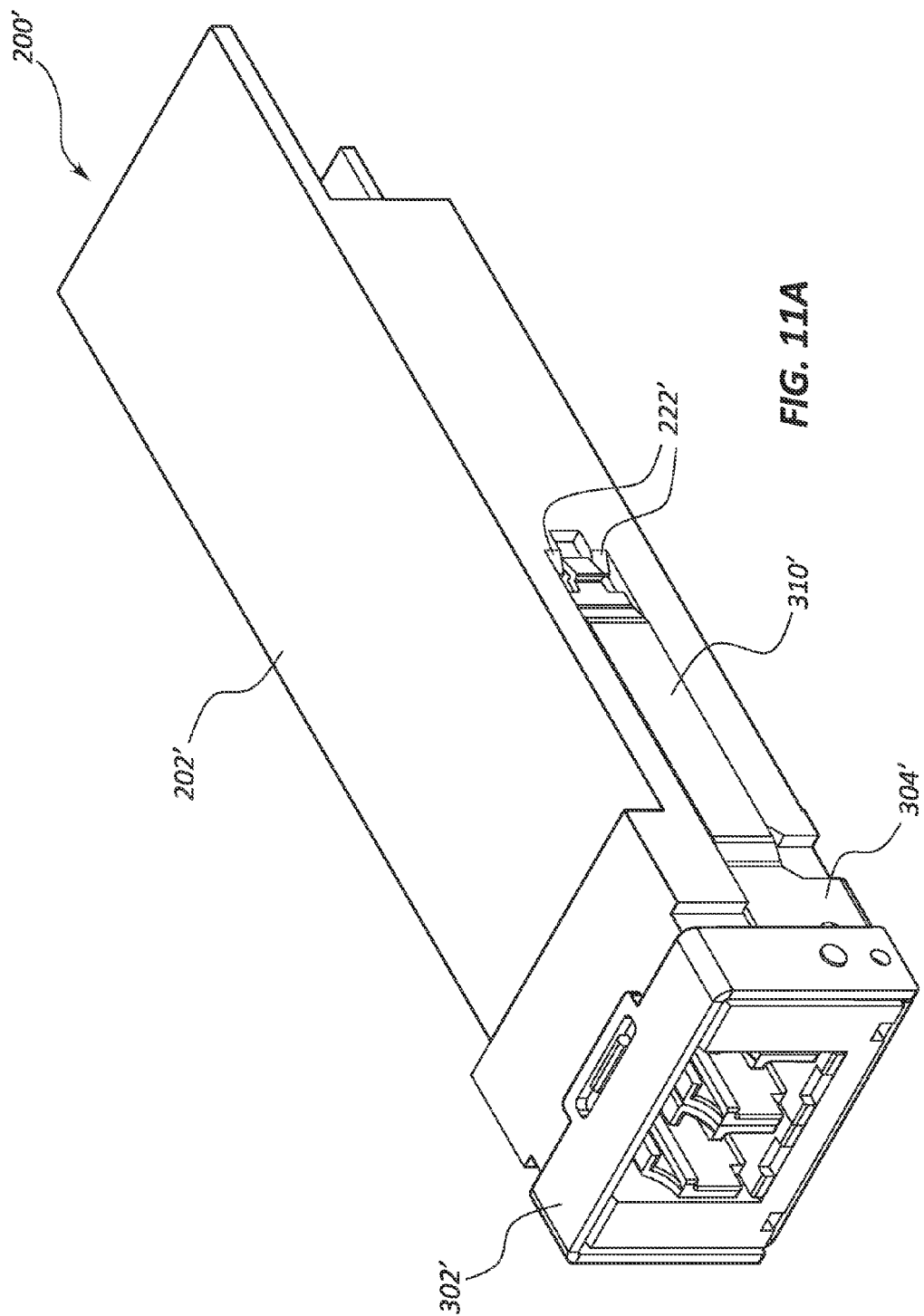

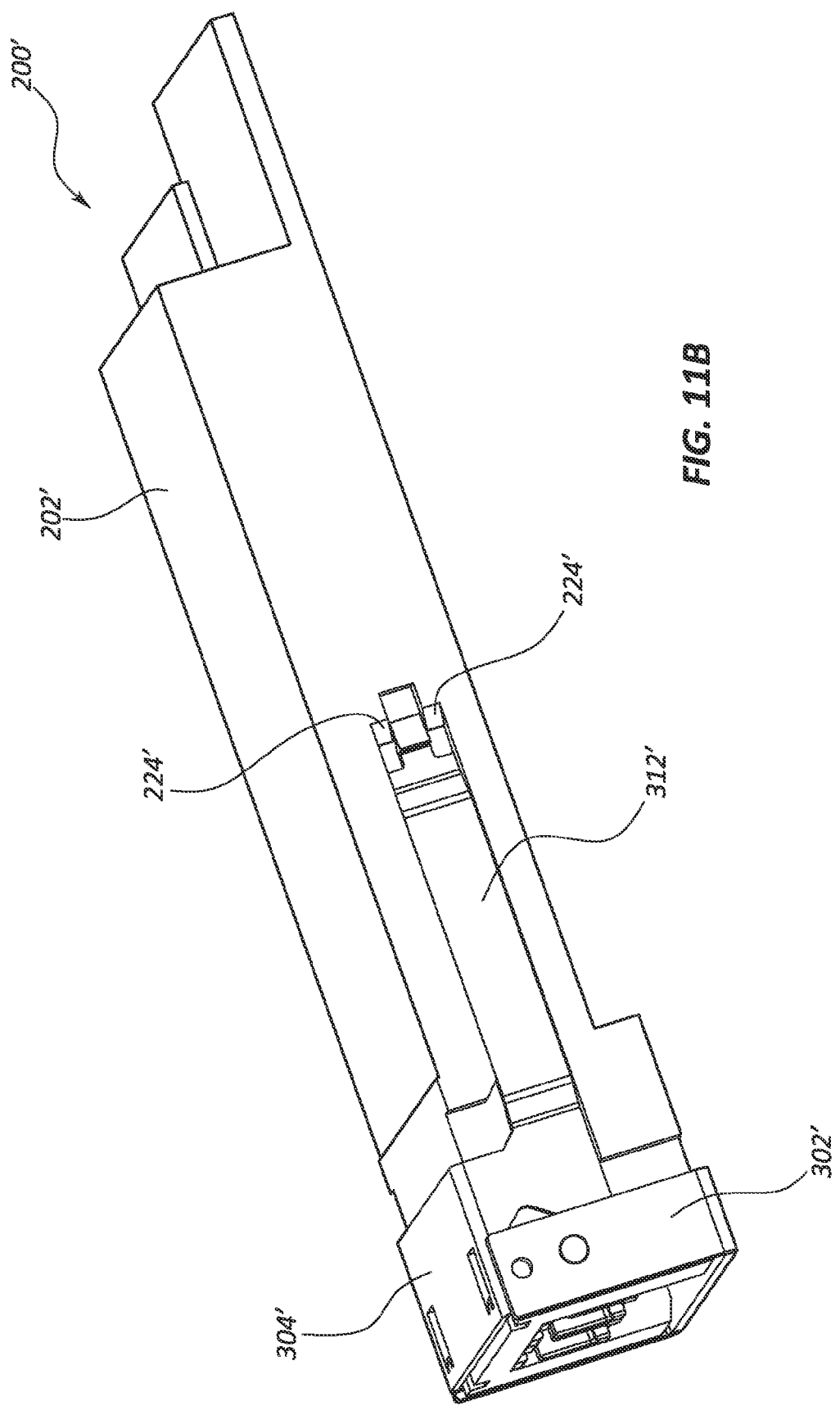

LATCHING MECHANISMS FOR PLUGGABLE ELECTRONIC DEVICES

CROSS-REFERENCE TO RELATED APPLICATIONS

This application is a Continuation of U.S. patent application Ser. No. 13/096,497, filed Apr. 28, 2011, titled LATCHING MECHANISMS FOR PLUGGABLE ELECTRONIC DEVICES, which is incorporated herein by reference in its entirety.

BACKGROUND

Pluggable electronic devices are increasingly used in connection with host electronic equipment. For example, pluggable electronic modules, such as pluggable electronic or optoelectronic transceiver modules, are increasingly used with host networking equipment for electronic and optoelectronic communication. Pluggable electronic modules typically communicate with a printed circuit board of a host device by transmitting electrical signals to the printed circuit board and receiving electrical signals from the printed circuit board. These electrical signals can then be transmitted by the pluggable electronic module outside the host device as electrical or optical signals. Multi-source agreements (MSAs) specify, among other things, body dimensions for pluggable electronic modules. Conformity with an MSA allows a pluggable electronic module to be plugged into host equipment designed in compliance with the MSA.

One common difficulty associated with pluggable electronic modules concerns the retention of the modules within corresponding host devices. Although various mechanisms have been developed in order to facilitate secure and precise retention of pluggable electronic modules within host devices, these mechanisms can be problematic in certain applications. In particular, these imprecise retention mechanisms can lease to imprecise electrical connections between a printed circuit board of a pluggable electronic module and a printed circuit board of a host device.

For example, many pluggable electronic module retention mechanisms introduce so called "backlash" into the positioning of the module within the host device. "Backlash" refers to an inadvertent repositioning of a pluggable electronic module within the host device due to the operation of the retention mechanism. This "backlash" generally degrades the precision of the electrical connections between the module printed circuit board and the host printed circuit board. Further, many host devices are configured to abut the pluggable electronic module against an uncontrolled feature within the host device, which can also degrade the precision of the electrical connections between the module printed circuit board and the host printed circuit board. This "backlash" and uncontrolled feature abutment contribute to imprecise alignment of electrical connections between the pluggable electronic module and host device, which can result in unacceptable signal loss at these electrical connections.

BRIEF SUMMARY OF SOME EXAMPLE EMBODIMENTS

In general, example embodiments of the invention relate to latching mechanisms for pluggable electronic devices. The example latching mechanisms disclosed herein can achieve precise alignment of electrical connections between a printed circuit board of a pluggable electronic device and a printed circuit board of a host device, which results in reduced levels of signal loss at these electrical connections.

In one example embodiment, a latching mechanism includes a driver and a follower. The driver is configured to rotate about an axis between a latched positioned and an unlatched position. The follower is operably connected to the driver and configured to slide axially along an electronic device toward the driver as the driver is rotated from the unlatched position to the latched position and slide axially along the electronic device away from the driver as the driver is rotated from the latched position to the unlatched position.

In another example embodiment, an electronic device includes a body and a latching mechanism attached to the body. The latching mechanism includes a driver and a follower. The driver is configured to rotate about an axis defined by the body between a latched positioned and an unlatched position. The follower is operably connected to the driver and configured to slide axially along the body during rotation of the driver. The follower includes a pair of follower arms configured to engage a host cage into which the body can be inserted in order to secure the body within the host cage.

In yet another example embodiment, an electronic system includes a host connector, a host cage, and an electronic device. The host connector is configured to be connected to a host printed circuit board. The host cage is configured to be connected to the host printed circuit board and is configured to at least partially surround the host connector. The host cage includes a pair of inwardly biased leaf springs that extend toward the host connector. The electronic device is configured to be at least partially received within the host cage. The electronic device includes a body, device printed circuit board, and a latching mechanism. The device printed circuit board extends from the body and is configured to be electrically coupled to the host connector. The latching mechanism is attached to the body. The latching mechanism includes a driver and a follower. The driver is configured to rotate about an axis defined by the body between a latched positioned and an unlatched position. The follower is operably connected to the driver and includes a pair of follower arms that are configured to slide axially along the body toward the driver as the driver is rotated from the unlatched position to the latched position in order to engage the leaf springs of the host cage in order to secure the body within the host cage.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter. Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify certain aspects of the present invention, a more particular description of the invention will be rendered by reference to example embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which:

FIG. 1A is a perspective view of portions of a first example host device and a first example optoelectronic module inserted into the example host device;

FIG. 3A is a partial cut-away side view of the example optoelectronic module of FIG. 1A during insertion into the example host device of FIG. 1A;

FIG. 3B is a partial cut-away top view of the view of FIG. 3A;

FIG. 4A is a partial cut-away side view of the example optoelectronic module of FIG. 1A after insertion into the example host device of FIG. 1A;

FIG. 4B is a partial cut-away top view of the view of FIG. 4A;

FIG. 5A is a partial cut-away side view during latching of the example optoelectronic module of FIG. 1A into the example host device of FIG. 1A;

FIG. 5B is a partial cut-away top view of the view of FIG. 5A;

FIG. 6A is a partial cut-away side view after latching of the example optoelectronic module of FIG. 1A into the example host device of FIG. 1A;

FIG. 6B is a partial cut-away top view of the view of FIG. 6A;

FIG. 11A is a top perspective view of the a second example optoelectronic module;

FIG. 11B is a bottom perspective view of the example optoelectronic module of FIG. 11A.

DETAILED DESCRIPTION OF SOME EXAMPLE EMBODIMENTS

Example embodiments of the present invention relate to latching mechanisms for pluggable electronic devices. Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

1. First Example Host Device and Pluggable Module

Figure 1B:
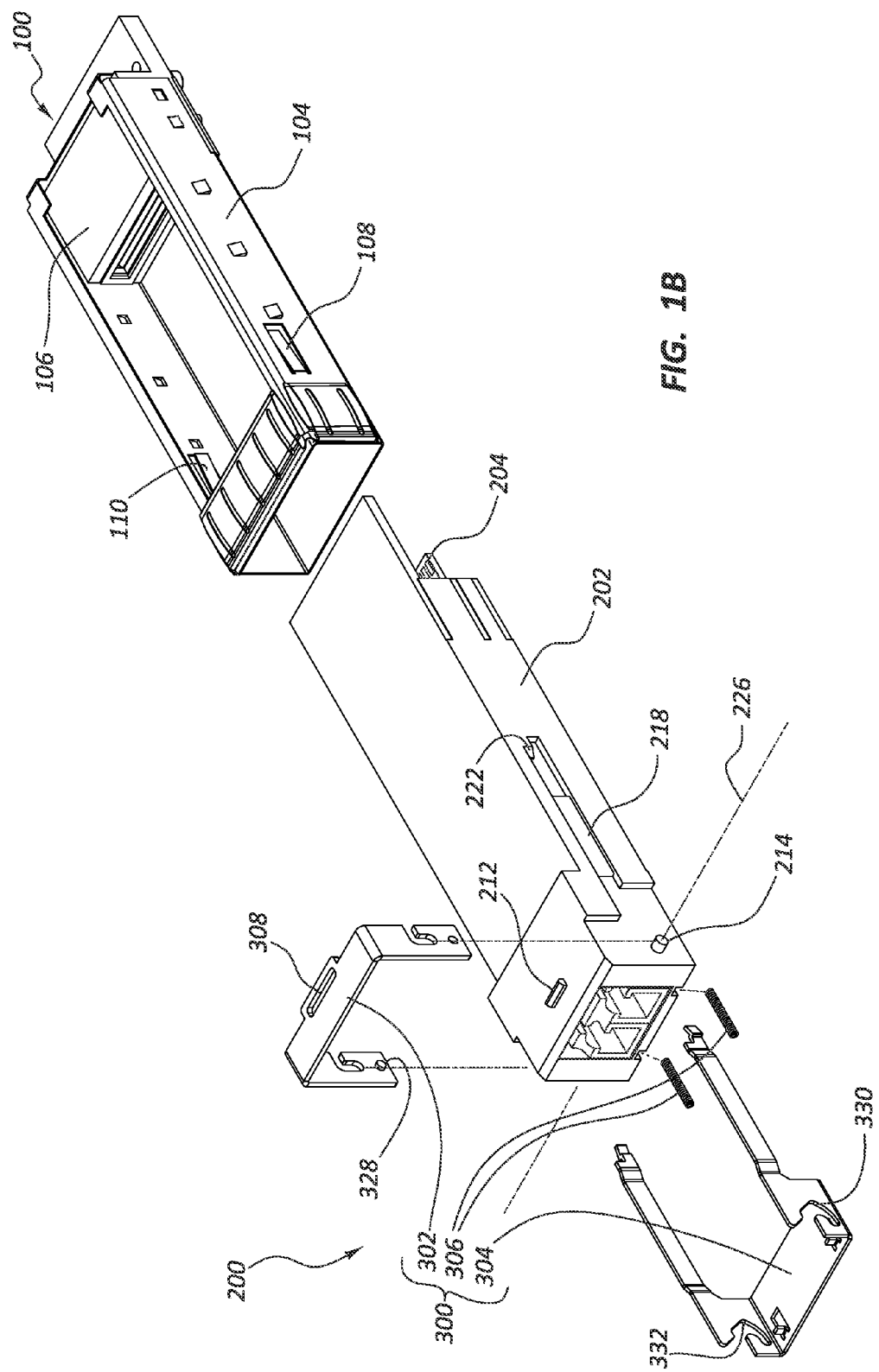
FIG. 1B is an exploded top perspective view of the example host device and the example optoelectronic module of FIG. 1A.
Figure 1C:
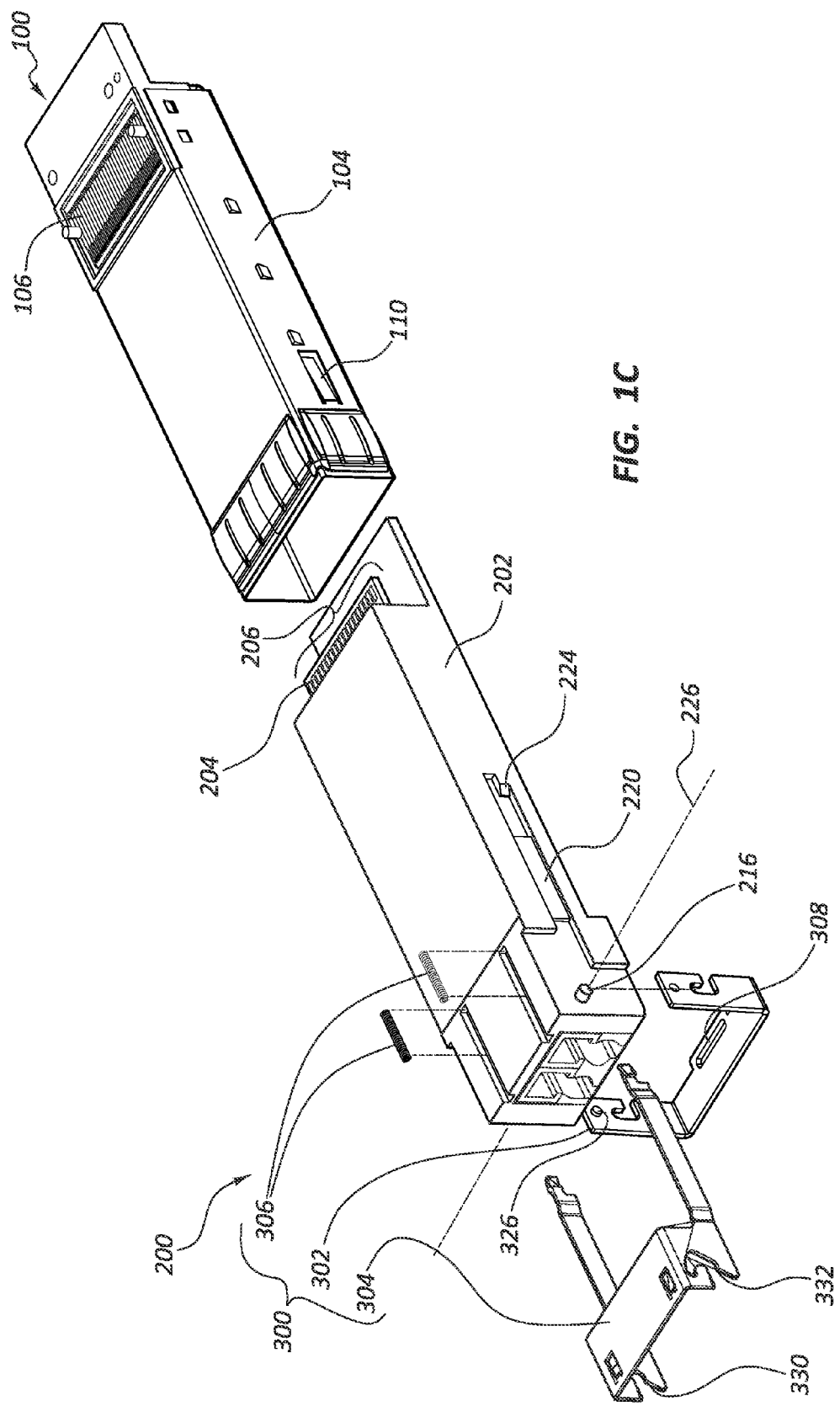
FIG. 1C is an exploded bottom perspective view of the example host device and the example optoelectronic module of FIGS. 1A and 1B.

Reference is first made to FIGS. 1A-1C, which disclose portions of an example host device 100 and an example pluggable optoelectronic transceiver module 200. In general, the module 200 can be employed in the communication of optical signals in connection with the host device 100 being employed in the communication of corresponding electrical signals.

The module 200 can be configured for optical signal transmission and reception at a variety of data rates including, but not limited to, 1.25 Gb/s, 2.125 Gb/s, 2.5 Gb/s, 4.25 Gb/s, 8.5 Gb/s, 10.3 Gb/s, 10.5 Gb/s, 11.3 Gb/s, 14.025 Gb/s, or 100 Gb/s, or higher. Furthermore, the module 200 can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the module 200 can be configured to support various communication protocols including, but not limited to, Optical Fast Ethernet, Optical Gigabit Ethernet, 10 Gigabit Ethernet, and 1×, 2×, 4×, 8×, and 16× Fibre Channel. In addition, although one example of the module 200 is configured to have a form factor that is substantially compliant with the CFP4 MSA, the module 200 can alternatively be configured in a variety of different form factors that are substantially compliant with other MSAs including, but not limited to, the CFP MSA, the CFP2 MSA, the QSFP MSA, the XFP MSA, the SFP MSA, or the SFP+ MSA. Finally, although the module 200 is a pluggable optoelectronic transceiver module, example embodiments of the latching mechanism disclosed herein can alternatively be employed in connection with pluggable electronic transceiver modules, or other pluggable electronic devices such as pluggable media drives for example.

As disclosed in FIGS. 1A, 1B, and 1C, the example host device 100 include a host printed circuit board 102 and a host cage 104 configured to be connected to the host printed circuit board 102. The host cage 104 includes a pair of inwardly biased leaf springs 108 and 110 that extend toward the host connector 106. The host cage 104 is configured to at least partially receive the module 200.

The host device 100 also includes a host connector 106 configured to be connected to the host printed circuit board 102 and configured to be at least partially surrounded by the host cage 104. The host connector 106 may have various designs including a one-piece design or a two-piece design. When configured as a one-piece design, the host connector 106 may include a plastic housing that contains connector contacts. As disclosed in FIG. 7, when configured as a two-piece design, the host connector 106 may include a plastic housing containing connector contact and a metal cover that surrounds the plastic connector that provides a more robust hard stop 114. The position P0 of the conductors 112 with respect to the position P1 of the hard stop 114, whether the hard stop 114 is formed from plastic or metal, can be precisely located using standard manufacturing capability.

As disclosed in FIGS. 1B and 1C, the example module 200 includes a body 202, a module printed circuit board 204 at least partially surrounded by the body 202, and a latching mechanism 300 attached to the body 202. An edge connector 206 of the module printed circuit board 204 extends from the body 202 and is configured to be electrically coupled to the host connector 106 once the module 200 in inserted into the host cage 104. As disclosed in FIG. 7, the length of the conductive pads 212 of the edge connector 206 can be tightly controlled, and the distance D0 between the contact point P0 on the conductive pads 212 and the position P1 of the hard stop 114, whether the hard stop 114 is formed from plastic or metal, can be precisely located using standard manufacturing capability. Thus, the host connector 106 electrically couples the module printed circuit board 204 to the host printed circuit board 102.

As disclosed in FIG. 1A, the body 202 defines a transmit port 208 and a receive port 210. As disclosed in FIGS. 1B and 1C, the body 202 also defines a protrusion 212, a pair of protrusions 214 and 216, a pair of mounds 218 and 220, and a pair of ramps 222 and 224 facing toward the latching mechanism 300. The various components and features of the body 202 can be formed using a die casting process. One example material from which the body 202 can be die cast is zinc, although the body 202 may alternatively be die cast, or otherwise manufactured, from other suitable materials or a combination of other suitable materials.

2. Example Latching Mechanism

As disclosed in FIGS. 1B and 1C, the example latching mechanism generally includes a driver 302, a follower 304, and a pair of springs 306. The driver 302 and the follower 304 may be formed in various ways including being stamped from metal or molded from hard plastic. The springs 306 are disclosed in FIGS. 1B and 1C as coil springs. However, the pair of springs 306 could instead be replaced with one or more torsional or wire springs, for example.

The driver 302 is configured to rotatably attach to the protrusions 214 and 216 of the body 202 and rotate about an axis 226 defined by the body 202 between an unlatched positioned (shown in FIGS. 3A and 3B) and a latched position (shown in FIGS. 6A and 6B). As disclosed in FIG. 1B, a secondary latch, made up of an opening 308 defined in the driver 302 that is configured to engage with the corresponding protrusion 212 from the body 202, functions to maintain the driver 302 in the latched position (shown in FIGS. 6A and 6B). A user can, however, pull on the driver 302 in order to slightly deform the driver 302 in order to overcome the engagement of the opening 308 and the protrusion 212 and rotate the driver 302 into the unlatched position (shown in FIGS. 3A and 3B).

Figure 2A:
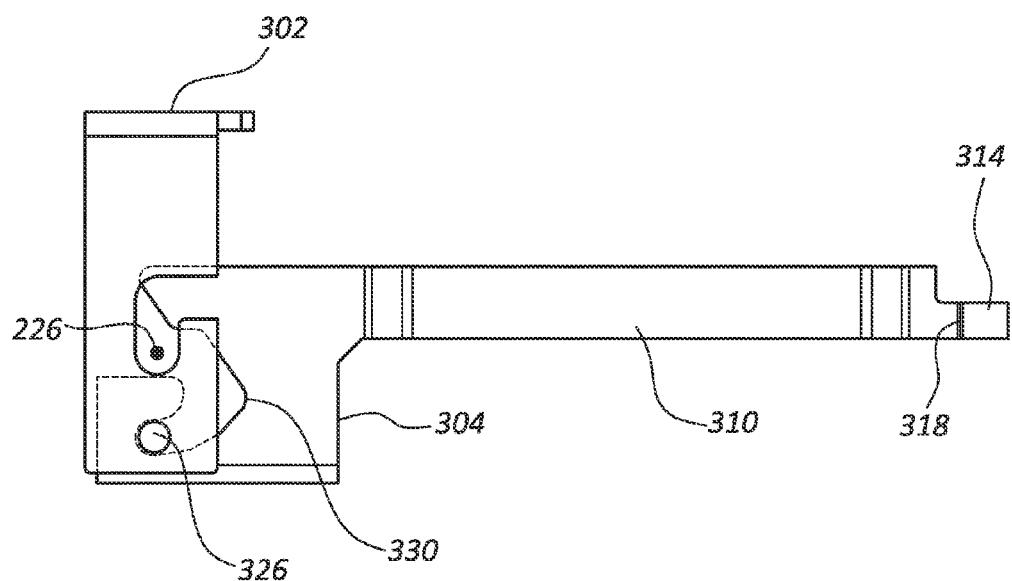
FIG. 2A is a side view of portions of an example latching mechanism.

It is understood that various other complementary structures other than the opening 308 and the protrusion 212 could instead be employed to maintain the driver 302 in the latched position (shown in FIGS. 6A and 6B). It is further understood that location of the axis 226 on the body 202 can be optimized to achieve a self-locking effect of the driver 302 in the latched position that does not rely on the secondary latch made up of the opening 308 and the corresponding protrusion 212. For example, this self-locking effect can be achieved by repositioning the positions of the axis 226 on the body 202 and the protrusion 326 on the driver 302 in FIG. 2A so that the protrusion 326 is positioned to the far right of the driver 302 and the axis 226 is positioned to the left and just above the repositioned protrusion 326.

Figure 2B:
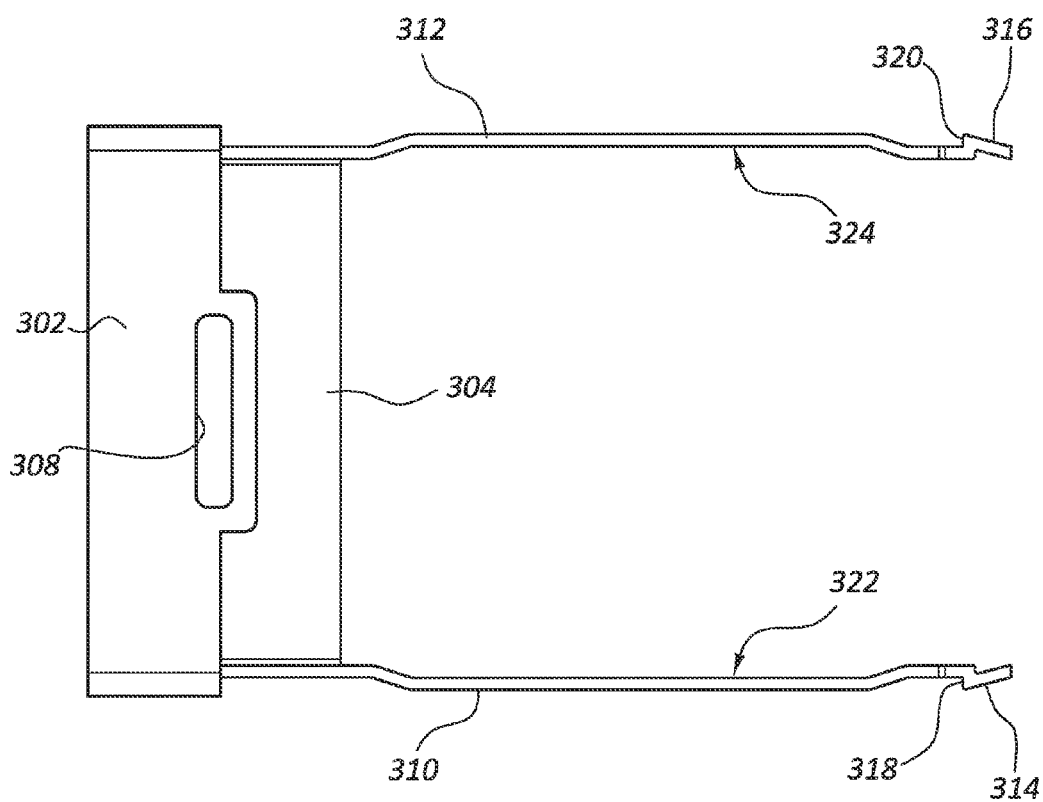
FIG. 2B is a top view of portions of an example latching mechanism.

The follower 304 is configured to slidably attach to the body 202. As disclosed in FIGS. 2A and 2B, the follower 304 includes a pair of follower arms 310 and 312. The follower arms 310 and 312 include ramps 314 and 316 facing away from the driver 302 and shoulder 318 and 320 facing toward the driver 302, respectively. It is noted that the ramps 314 and 316 could be replaced with non-ramped surfaces. The follower arms 310 and 312 also define indentations 322 and 324 that are configured to slidably engage with the corresponding mounds 218 and 220 of the body 202 (see FIGS. 1B and 1C), respectively, to slidably couple the follower 304 to the body 202. During assembly, the follower arms 210 and 312 of the follower 304 can be bent outward in order to initially slide the follower arms 310 and 312 over the mounds 218 and 220 and then released so that the mounds 218 and 220 are positioned within the indentations 322 and 324, respectively.

As disclosed in FIGS. 1B and 1C, the driver 302 further includes a pair of protrusions 326 and 328. As disclosed in FIG. 1B, the follower 304 further includes a pair of corresponding curved surfaces 330 and 332. As disclosed in FIGS. 1B, 1C, and 2A, the protrusions 326 and 328 are configured to slide against the corresponding curved surfaces 330 and 332, respectively, during rotation of the driver 302 in order to cause axial sliding of the follower 304 along the body 202. The springs 306 and 308 disclosed in FIGS. 1B and 1C bias the surfaces 330 and 332 against the protrusions 326 and 328, respectively.

With reference now to FIGS. 3A-10B, aspects of the operation of the example latching mechanism 300 will be disclosed. Although the example latching mechanism 300 is employed herein in connection with the example host device 100 and the example optoelectronic transceiver module 200, it is understood that the example latching mechanism 300 could instead be employed in connection with other electronic devices and host equipment.

During the insertion of the module 200 into the host cage 104 of the host device 100, as disclosed in FIGS. 3A-6B, the driver 302 may initially be in the unlatched position, as disclosed in FIGS. 3A and 3B. A user can grasp the driver 302 and push against the driver 302 in order to insert the module 200 into the host cage 104. It is noted that during the insertion of the module 200 into the host cage 104, the ramps 314 and 316 and the shoulders 318 and 320 of the follower arms 310 and 312 are positioned and oriented to avoid engagement with the leaf springs 108 and 110 of the host cage 104. Thus, although the leaf springs 108 and 110 of the host cage 104 are inwardly biased, the leaf springs 108 do not substantially impede the insertion of the example optoelectronic module 200 into the host cage 104.

Once the module 200 has been fully inserted into the host cage 104, as disclosed in FIGS. 4A and 4B, the leaf springs 108 and 110 of the host cage 104 flex inward forward of the shoulders 318 and 320 of the follower arms 310 and 312. Also, once in the fully inserted position disclosed in FIGS. 4A and 4B, the edge connector 206 of the module printed circuit board 204 of the module 200 is electrically connected to the host connector 106. The host connector 106 functions as a hard stop to prevent the module 200 from being inserted any further into the host cage 104. Maintaining the fully inserted position of the module 200 disclosed in FIGS. 4A and 4B can help achieve precise electrical connections between the edge connector 206 and the host connector 106. Maintaining this fully inserted position of the module 200 can be achieved using the latching mechanism 300.

As disclosed in FIGS. 5A and 5B, as the driver 302 of the latching mechanism 300 is rotated upward, the repositioning of the protrusions 326 and 328 (see FIG. 1B) along the surfaces 330 and 332 (see FIG. 1B) and the spring 306 cause the follower 304 to slide axially along the body 202 toward the driver 302 and the front of the module 200. This forward sliding of the follower 304 causes the shoulders 318 and 320 to engage the leaf springs 108 and 110 of the host cage 104. Then, as disclosed in FIGS. 6A and 6B, as the driver 302 completes its upward rotation into the latched position, the protrusions 326 and 328 (see FIG. 1B) continue sliding the surfaces 330 and 332 (see FIG. 1B) which forces further engagement of the shoulders 318 and 320 and the leaf springs 108 and 110, respectively. The engagement of the shoulders 318 and 320 and the leaf springs 108 and 110, respectively, forces the module 200 to abut the host connector 106. Once driver is fully rotated into the engaged position disclosed in FIGS. 6A and 6B, the opening 308 defined in the driver 302 engages with the corresponding protrusion 212 from the body 202, thus maintaining the driver 302 in the latched position.

Once the module 200 is fully inserted into the host cage 104 and the driver 302 has been rotated into the latched position, the example latching mechanism 300 secures the module 200 within the host cage 104 and abutted against the host connector 106. Abutment of the module 200 against the host connector 106 enables tight tolerances and precise alignment of the edge connector 206 with respect to the host connector 106, which results in precise electrical connections between the module 200 and the host device 100.

Figure 7:
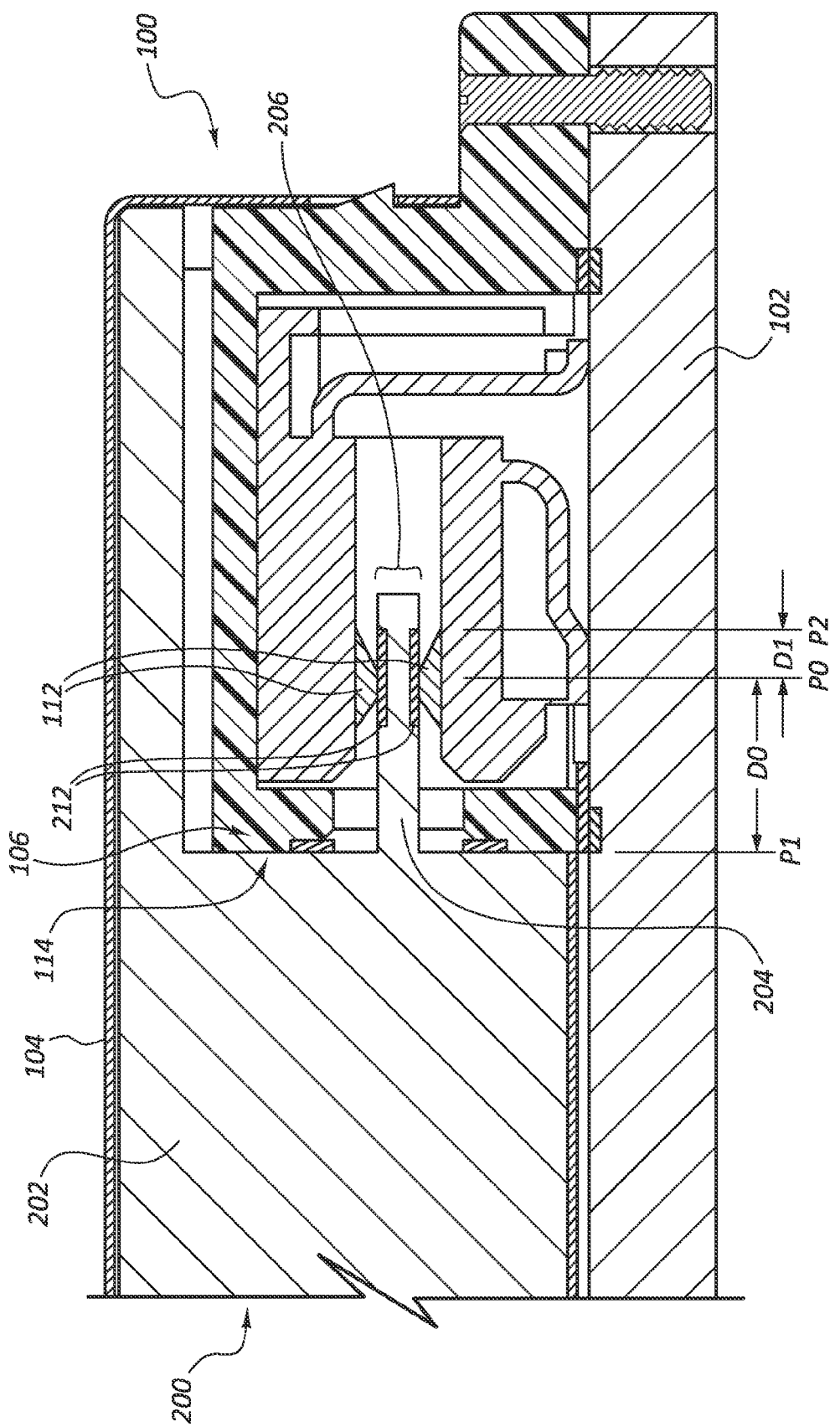
FIG. 7 is a cross-sectional side view of a portion of the example optoelectronic module of FIG. 1A and the example host device of FIG. 1A.
Figure 8A:
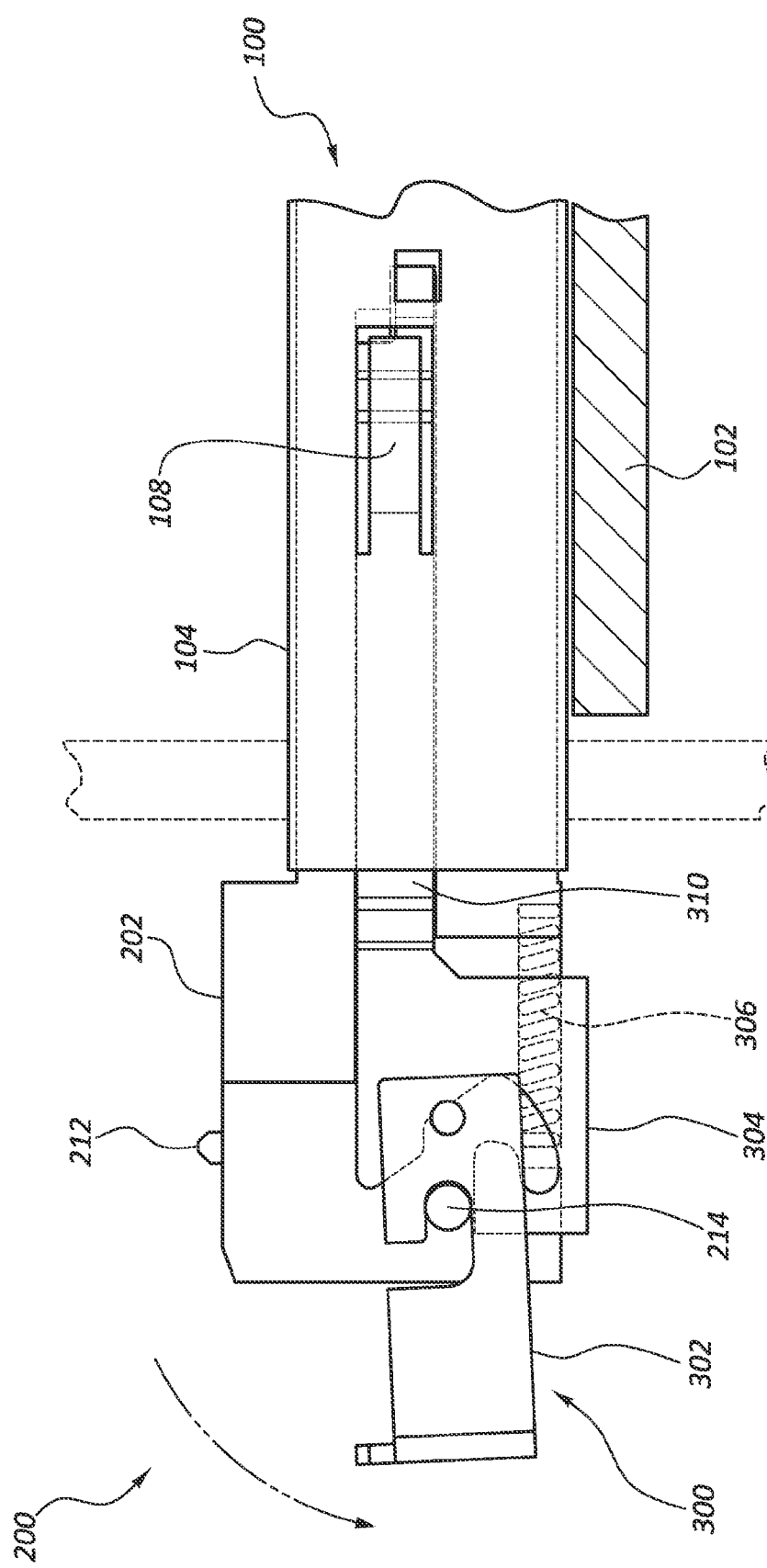
FIG. 8A is a partial cut-away side view after unlatching of the example optoelectronic module of FIG. 1A from the example host device of FIG. 1A.
Figure 8B:
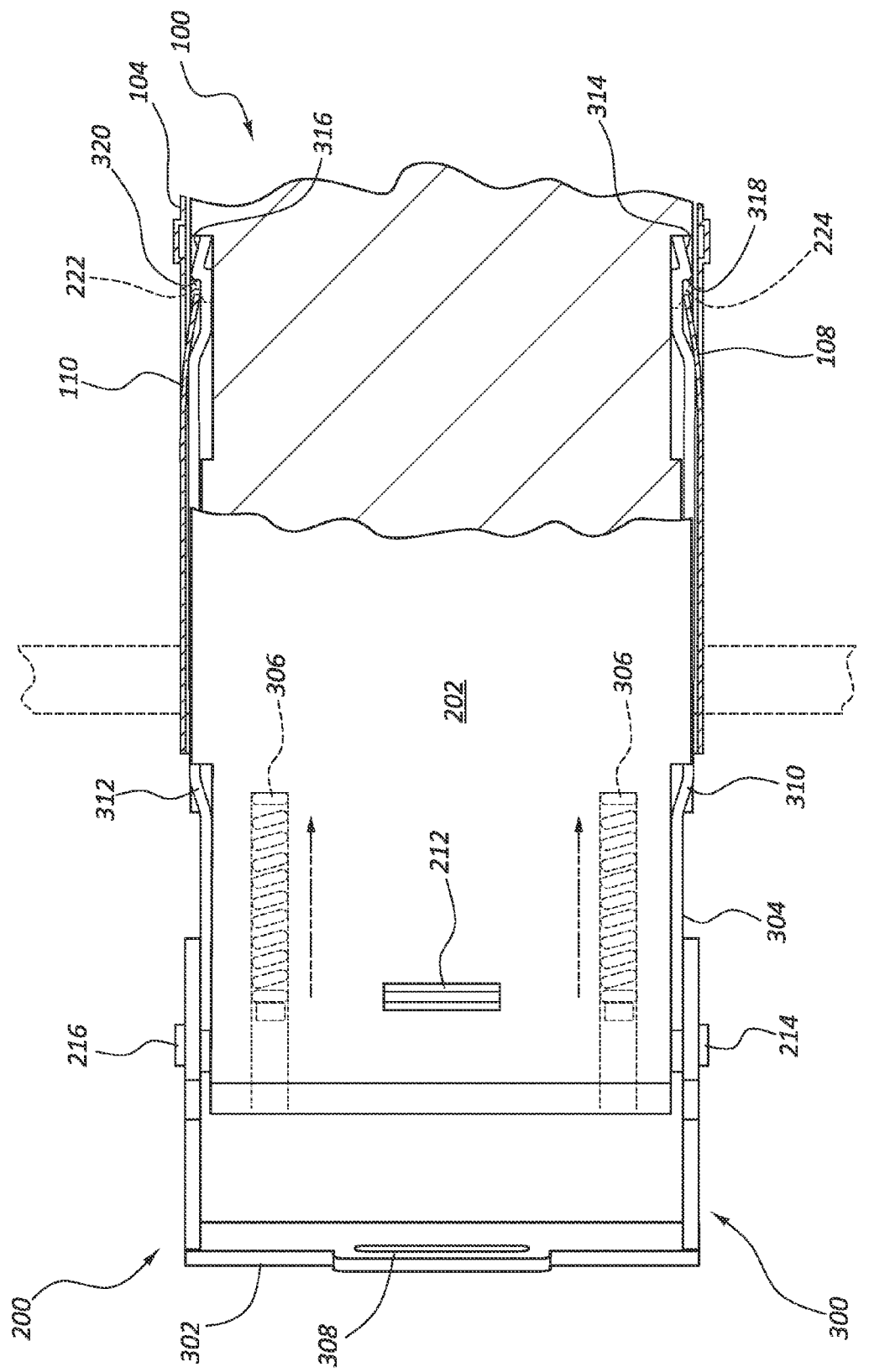
FIG. 8B is a partial cut-away top view of the view of FIG. 8A.

As disclosed in FIG. 7, the edge connector 206 of the printed circuit board 204 includes conductive pads 212 on the top and bottom surfaces of the edge connector 206. The host connector 106 includes corresponding conductors 112 that are configured to align with and make physical contact with of the conductive pads 212. The tight tolerances and precise alignment of the edge connector 206 with the host connector 106 that is enabled by the lack of a "backlash" in the example latching mechanism 300 and the abutment of the module 200 directly against the host connector 106 also enable the distance D1 between the point of contact P0 between the conductors 112 and the conductive pads 212 and the end P2 of the conductive pads 212 to be reduced and tightly controlled. The tight tolerances that enable the reduction in the distance D1 result in reduced levels of signal loss from the conductive pads 212, especially at data rates around and above 100 Gb/s.

In order to extract the module 200 from the host cage 104 of the host device 100, as disclosed in FIGS. 8A-10B, the driver 302 must be rotated from the latched position (shown in FIGS. 6A and 6B) to the unlatched position (shown in FIGS. 3A and 3B). As disclosed in FIGS. 8A and 8B, as the driver 302 is rotated to the unlatched position, the follower 304 slides axially along the body 202 away from the driver 302 and the front of the module 200. This axial sliding of the follower 304 causes the shoulders 318 and 320 to disengage from the leaf springs 108 and 110 and be repositioned to extend past the ramps 222 and 224 formed in the body 202 of the module 200. Therefore, once the driver 302 is positioned in the unlatched position disclosed in FIGS. 8A and 8B, the shoulders 318 and 320 are positioned and oriented to avoid engagement with the leaf springs 108 and 110 of the host cage 104.

Figure 9A:
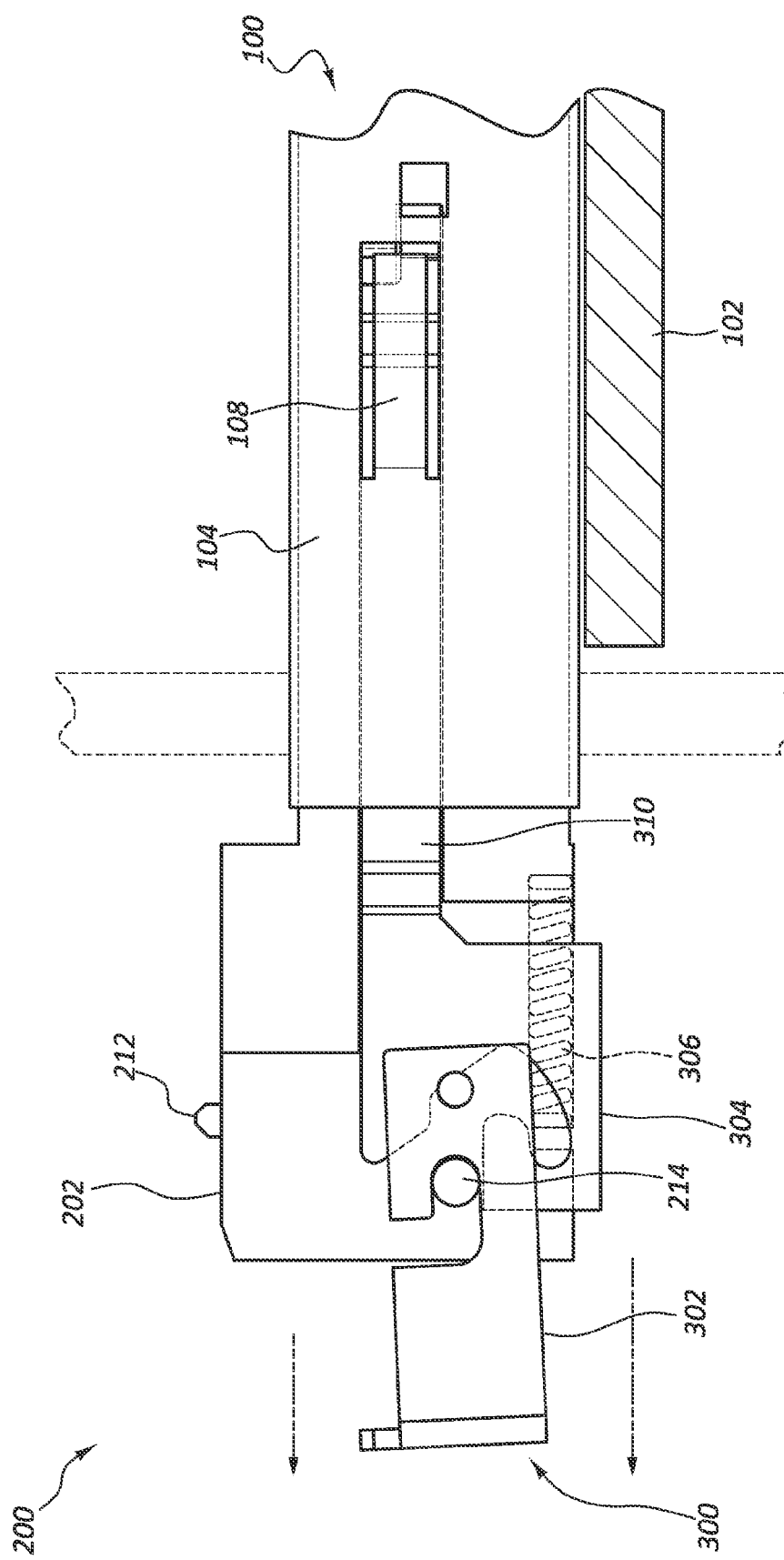
FIG. 9A is a partial cut-away side view of the example optoelectronic module of FIG. 1A during extraction from the example host device of FIG. 1A.
Figure 9B:
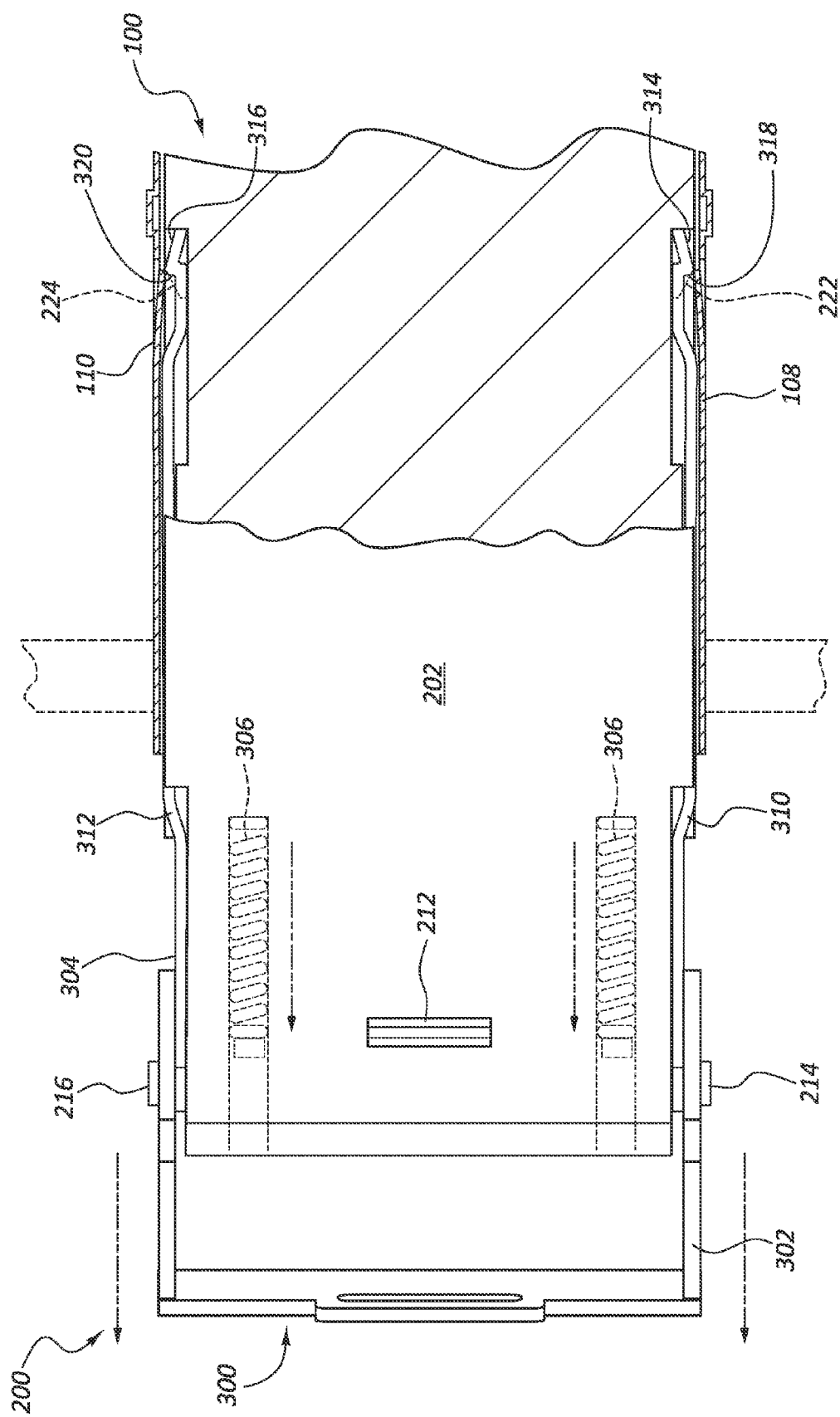
FIG. 9B is a partial cut-away top view of the view of FIG. 9A.
Figure 10A:
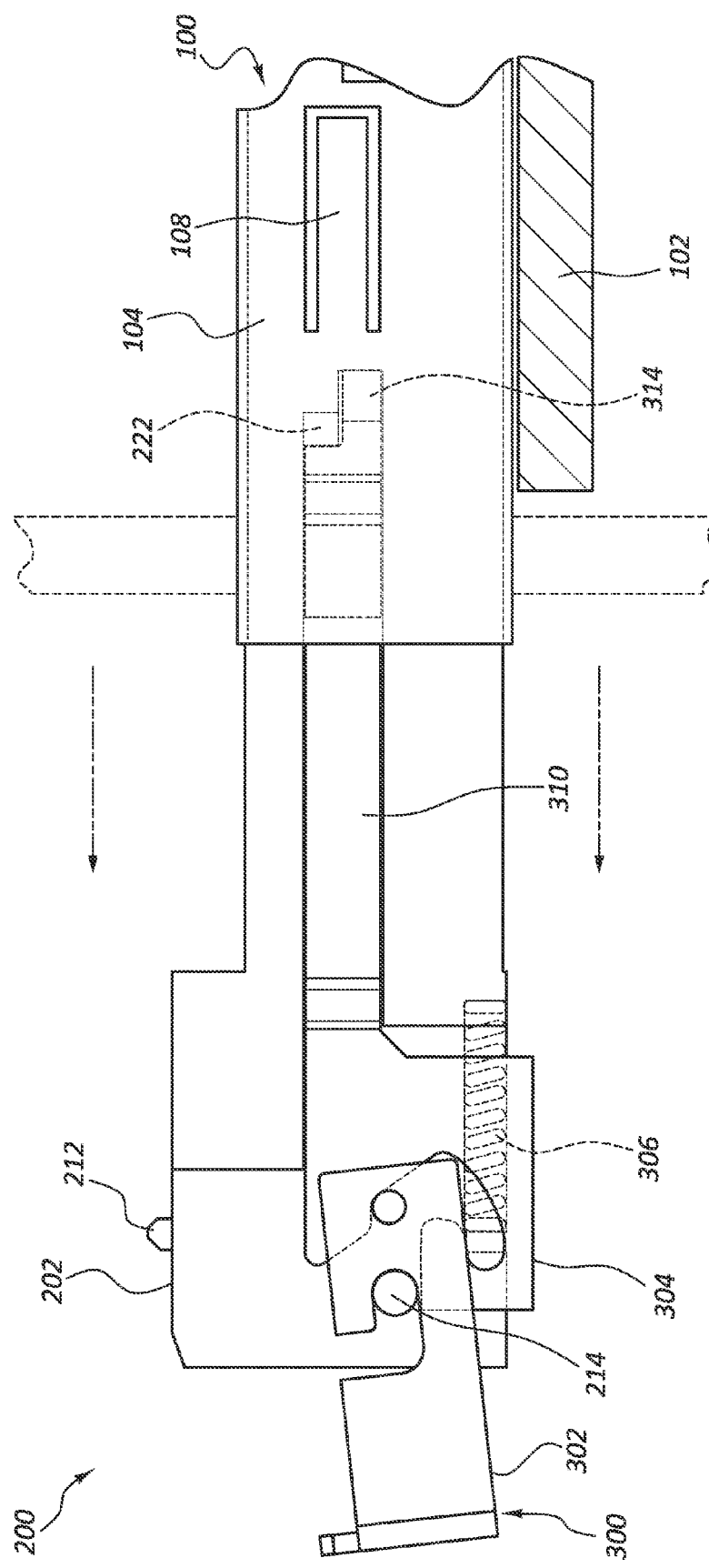
FIG. 10A is another partial cut-away side view of the example optoelectronic module of FIG. 1A during extraction from the example host device of FIG. 1A.
Figure 10B:
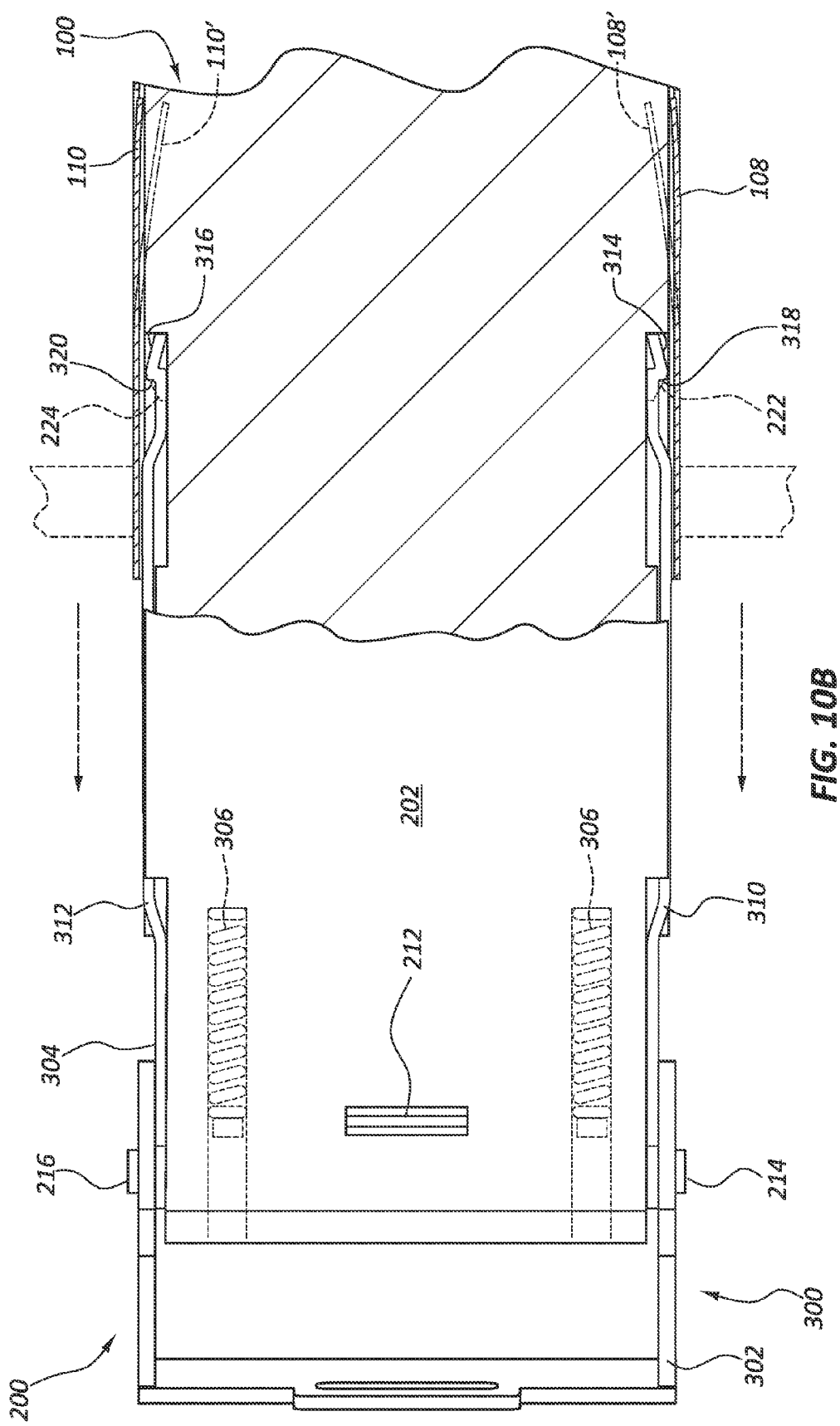
FIG. 10B is a partial cut-away top view of the view of FIG. 10A.

As disclosed in FIGS. 9A and 9B, as the driver 302 is pulled to extract the module 200 from the host cage 104 with the driver 302 in the unlatched position, the leaf springs 108 and 110 of the host cage 104 slide along the ramps 222 and 224 formed in the body 202. Thus, although the leaf springs 108 and 110 of the host cage 104 are inwardly biased, while the driver 302 is in the unlatched position the ramps 222 and 224 force the leaf springs 108 and 110 outward during extraction of the module 200, thus allowing the shoulders 318 and 320 to slide underneath and forward of the leaf springs 108 and 110 of the host cage 104. Thus, while the driver 302 is in the unlatched position, the leaf springs 108 and 110 do not substantially impede the extraction of the module 200 from the host cage 104. Then, as disclosed in FIGS. 10A and 10B, the driver 302 can continue to be pulled until the module 200 is completely extracted from the cage 104. Once the module 200 is completely extracted from the cage 104, the leaf springs 108 and 110 return to the positions shown in phantom at 108' and 110'.

3. Second Example Host Device and Pluggable Module

Figure 12:
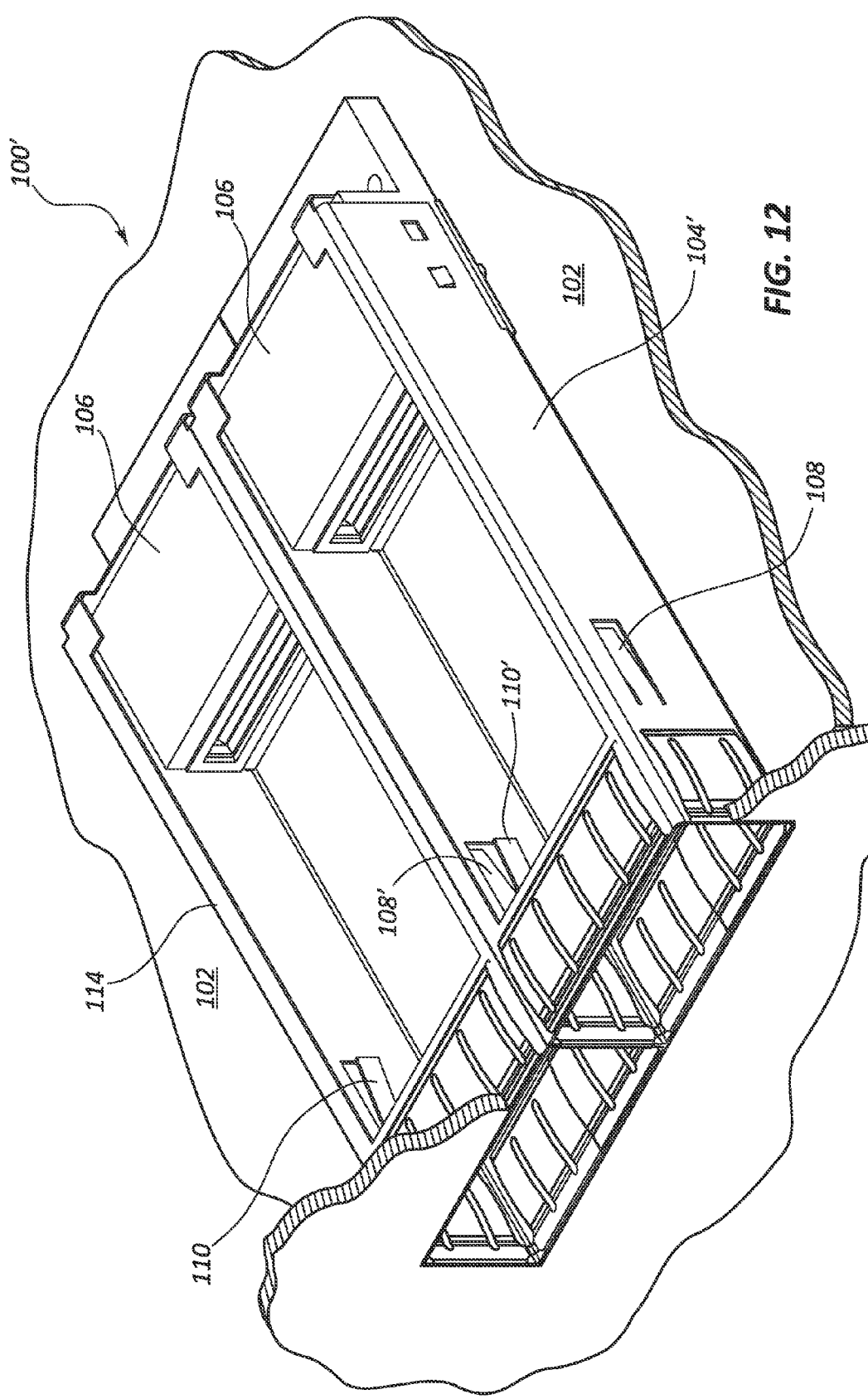
FIG. 12 is a perspective view of portions of a second example host device.

Reference is now made to FIGS. 11A, 11B, and 12, which disclose a second example pluggable optoelectronic transceiver module 200' and portions of a second example host device 100'.

As disclosed in FIGS. 11A and 11B, the pluggable optoelectronic transceiver module 200' is identical to the pluggable optoelectronic transceiver module 200 except that the pluggable optoelectronic transceiver module 200' includes a pair of ramps 222' instead of a single ramp 222, a pair of ramps 224' instead of a single ramp 224, the follower arms 310' and 312' of the follower 304' differ slightly from the follower arms 310 and 312 of the follower 304, and the driver 302' is attached to the body 202' without the use of the L-shaped cutout included in the driver 302.

As disclosed in FIG. 12, the host device 100' is identical to the host device 100 except that the host device host device 100' includes two cages 104' and 114 instead of a single cage 104. The cages 104' and 114 are positioned side-by-side on the printed circuit board 102. The cage 104' includes a leaf spring 108 and a leaf spring 110' that is identical to the leaf spring 110 except that it positioned lower along the sidewall of the cage 104'. The cage 104' also includes a third leaf spring 108' that extends into the cage 114 and functions in the cage 114 similarly to the function of the leaf spring 108 in the cage 104'. The cage 114 also includes a leaf spring 110. It is noted that although only a pair of cages is disclosed in FIG. 12, the host device 100' could instead include more than two cages positioned side-by-side on the printed circuit board 102.

The alternate positioning of the leaf spring 108' and 110' is accommodated by the dual ramps 222' and ramps 224'. In particular, regardless of whether a leaf spring is the top leaf spring, such as the leaf spring 108', or a bottom leaf spring, such as the leaf spring 110', the dual ramps 222' and 224' will force the leaf spring outward during extraction of the module 200'.

The example embodiments disclosed herein may be embodied in other specific forms. The example embodiments disclosed herein are to be considered in all respects only as illustrative and not restrictive.

What is claimed is:
1. A host device comprising:
   a host connector connected to a host printed circuit board, the host connector sized and shaped to receive and electrically connect to an edge connector of a printed circuit board of a pluggable electronic device; and
   a host cage connected to the host printed circuit board and shaped to at least partially surround the host connector, the host cage also sized and shaped to at least partially receive the pluggable electronic device, the host cage including a pair of inwardly biased leaf springs that extend toward the host connector;

wherein the host connector comprises a hard stop for the pluggable electronic device such that the pluggable electronic device abuts the host connector to prevent the pluggable electronic device from being inserted further into the host cage;

wherein the hard stop includes an upper face and a lower face of the host connector, the upper face and the lower face defining a slot sized and shaped to receive the edge connector of the printed circuit board, the slot positioned between the upper face and the lower face, the upper face and the lower face positioned to abut the pluggable electronic device when the edge connector of the printed circuit board is positioned in the slot; and conductive pads, the conductive pads positioned entirely in the slot between the upper face and the lower face.

2. The host device as recited in claim 1, wherein each of the leaf springs are sized, shaped, and positioned to:

engage with corresponding shoulders of a pair of follower arms of a follower to prevent the pluggable electronic device from being removed from the host cage; and disengage from the shoulders of the follower arms as the follower is slid axially away from a front of the pluggable electronic device such that body ramps of the pluggable electronic device bias the leaf springs outward to enable the shoulders of the follower arms to slide past the leaf springs to permit the pluggable electronic device to be removed from the host cage.

3. The host device as recited in claim 2, wherein engagement of the shoulders and the leaf springs forces the pluggable electronic device to abut the hard stop of the host connector.

4. The host device as recited in claim 2, wherein the leaf springs flex inward of the shoulders of the follower arms when the pluggable electronic device is fully inserted into the host cage.

5. The host device as recited in claim 2, wherein the follower is operably connected to a driver configured to rotate about an axis between a latched position and an unlatched position, wherein the driver is configured to slide the follower axially toward the front of the electronic device as the driver is rotated from the unlatched position to the latched position and slide the follower axially away from the front of the electronic device as the driver is rotated from the latched position to the unlatched position, the driver further configured to position the follower axially farther away from the front of the electronic device when the driver is positioned in the unlatched position than when the driver is positioned in the latched position.

6. The host device as recited in claim 1, wherein the pluggable electronic device to be received by the host cage comprises an electronic or optoelectronic transceiver module that is substantially compliant with the CFP2 MSA, CFP4 MSA, XFP MSA, or the QSFP MSA.

7. The host device as recited in claim 1, wherein the leaf springs do not substantially impede the insertion of the pluggable electronic device into the host cage.

8. A host device comprising:

a host connector connected to a host printed circuit board, the host connector sized and shaped to receive and electrically connect to an edge connector of a printed circuit board of a pluggable electronic device; and a host cage connected to the host printed circuit board and shaped to at least partially surround the host connector, the host cage also sized and shaped to at least partially receive the pluggable electronic device, the host cage including a pair of inwardly biased leaf springs that extend toward the host connector;

wherein the host connector comprises a hard stop for the pluggable electronic device to prevent the pluggable electronic device from being inserted further into the host cage;

wherein the hard stop includes an upper face and a lower face of the host connector, the upper face and the lower face defining a slot sized and shaped to receive the edge connector of the printed circuit board, the slot positioned between the upper face and the lower face, the upper face and the lower face positioned to abut the pluggable electronic device when the edge connector of the printed circuit board is positioned in the slot; and conductive pads, the conductive pads positioned entirely in the slot between the upper face and the lower face.

9. The host device as recited in claim 8, wherein at least one of the leaf springs is sized, shaped, and positioned to:

engage with a shoulder of a follower to prevent the pluggable electronic device from being removed from the host cage; and disengage from the shoulder of the follower as the follower is slid axially away from a front of the pluggable electronic device such that body ramps of the pluggable electronic device bias the leaf springs outward to enable the shoulder of the follower to slide past the leaf springs.

10. The host device as recited in claim 9, wherein the follower includes a pair of follower arms each comprising the shoulder that is configured to engage the leaf springs to prevent the pluggable electronic device from being removed from the host cage.

11. The host device as recited in claim 9, wherein engagement of the shoulders and the leaf springs forces the pluggable electronic device to abut the hard stop of the host connector.

12. The host device as recited in claim 9, wherein the leaf springs flex inward of the shoulders of the follower arms when the pluggable electronic device is fully inserted into the host cage.

13. The host device as recited in claim 9, wherein the leaf springs are configured to be biased outward by body ramps of the pluggable electronic device to enable the shoulders of the follower arms to slide past the leaf springs.

14. The host device as recited in claim 9, wherein the leaf springs do not substantially impede the insertion of the pluggable electronic device into the host cage.

15. The host device as recited in claim 8, wherein the pluggable electronic device to be received by the host cage comprises an electronic or optoelectronic transceiver module that is substantially compliant with the CFP2 MSA, CFP4 MSA, XFP MSA, or the QSFP MSA.

* * * * *